US008818095B2

(12) United States Patent
Du

(10) Patent No.: US 8,818,095 B2
(45) Date of Patent: Aug. 26, 2014

(54) IMAGE PROCESSING APPARATUS, IMAGE PROCESSING METHOD, AND COMPUTER-READABLE, NON-TRANSITORY MEDIUM

(75) Inventor: Jiyun Du, Kahoku (JP)

(73) Assignee: PFU Limited, Kahoku-shi (JP)

( * ) Notice: Subject to any disclaimer, the term of this patent is extended or adjusted under 35 U.S.C. 154(b) by 94 days.

(21) Appl. No.: 13/543,544

(22) Filed: Jul. 6, 2012

(65) Prior Publication Data

US 2013/0044952 A1 Feb. 21, 2013

(30) Foreign Application Priority Data

Aug. 18, 2011 (JP) .................. 2011-178855

(51) Int. Cl.
- *G06K 9/38* (2006.01)
- *G06K 9/46* (2006.01)
- *H04N 1/403* (2006.01)

(52) U.S. Cl.
CPC .. *G06K 9/46* (2013.01); *G06K 9/38* (2013.01); *G06K 2209/01* (2013.01); *H04N 1/403* (2013.01)
USPC ....................................... 382/170

(58) Field of Classification Search
CPC ......... G06K 9/38; G06K 9/46; G06K 9/4642; G06K 9/4647; G06K 9/6212; G06T 5/40; G06T 9/00; G06T 9/008; G06T 2207/20144; G06T 2207/20148; H04N 1/00769; H04N 1/403; H04N 1/4053; H04N 1/4092; H04N 1/56; H04N 19/0009; H04N 19/00963; H04N 21/234354; H04N 21/440254

See application file for complete search history.

(56) References Cited

U.S. PATENT DOCUMENTS

| 4,736,315 | A | 4/1988 | Ozaki et al. |
|---|---|---|---|
| 6,266,439 | B1 * | 7/2001 | Pollard et al. ................. 382/164 |
| 6,363,162 | B1 | 3/2002 | Moed et al. |
| 6,415,062 | B1 | 7/2002 | Moed et al. |
| 6,473,522 | B1 * | 10/2002 | Lienhart et al. ............... 382/168 |
| 6,507,670 | B1 | 1/2003 | Moed |
| 6,587,576 | B1 | 7/2003 | Wesolkowski |
| 6,674,899 | B2 | 1/2004 | Nagarajan et al. |
| 7,024,043 | B1 | 4/2006 | Fujimoto et al. |
| 7,379,594 | B2 | 5/2008 | Ferman et al. |
| 7,386,168 | B2 * | 6/2008 | Misawa ........................ 382/166 |
| 7,475,807 | B2 | 1/2009 | Halpin et al. |
| 7,522,760 | B1 | 4/2009 | Will et al. |

(Continued)

FOREIGN PATENT DOCUMENTS

| JP | 6-113139 | 4/1994 |
|---|---|---|
| JP | 4077094 | 6/2000 |
| JP | 2007-28362 A | 2/2007 |

*Primary Examiner* — Jose Couso
(74) *Attorney, Agent, or Firm* — Christie, Parker & Hale, LLP

(57) ABSTRACT

There are provided an image processing apparatus, image processing method and a computer-readable, non-transitory medium that can binarize the input image so that the characters can be differentiated with high accuracy from the background area. The image processing apparatus includes an edge pixel extractor for extracting edge pixels from an input image, a first histogram generator for generating a first histogram based on a luminance value of each of the edge pixels, a second histogram generator for generating a second histogram based on a minimum luminance value among the luminance values of pixels neighboring each of the edge pixels, a static threshold calculator for obtaining a static threshold based on the first histogram and the second histogram, and a binarization unit for binarizing the input image by using the static threshold.

11 Claims, 16 Drawing Sheets

(56) References Cited

U.S. PATENT DOCUMENTS

| | | |
|---|---|---|
| 7,672,484 B2 | 3/2010 | Wiedemann et al. |
| 8,081,799 B2 | 12/2011 | Wiedemann et al. |
| 8,144,986 B2 * | 3/2012 | Ma .................... 382/169 |
| 8,150,202 B2 * | 4/2012 | Mohanty et al. ....... 382/274 |
| 8,306,325 B2 | 11/2012 | Chang |
| 8,467,614 B2 | 6/2013 | Fosseide et al. |
| 2004/0136586 A1 | 7/2004 | Okamura |
| 2006/0115141 A1 | 6/2006 | Koakutsu et al. |
| 2007/0019243 A1 | 1/2007 | Sato et al. |
| 2008/0050030 A1 | 2/2008 | Hara |
| 2009/0252434 A1 | 10/2009 | Zhou |

* cited by examiner

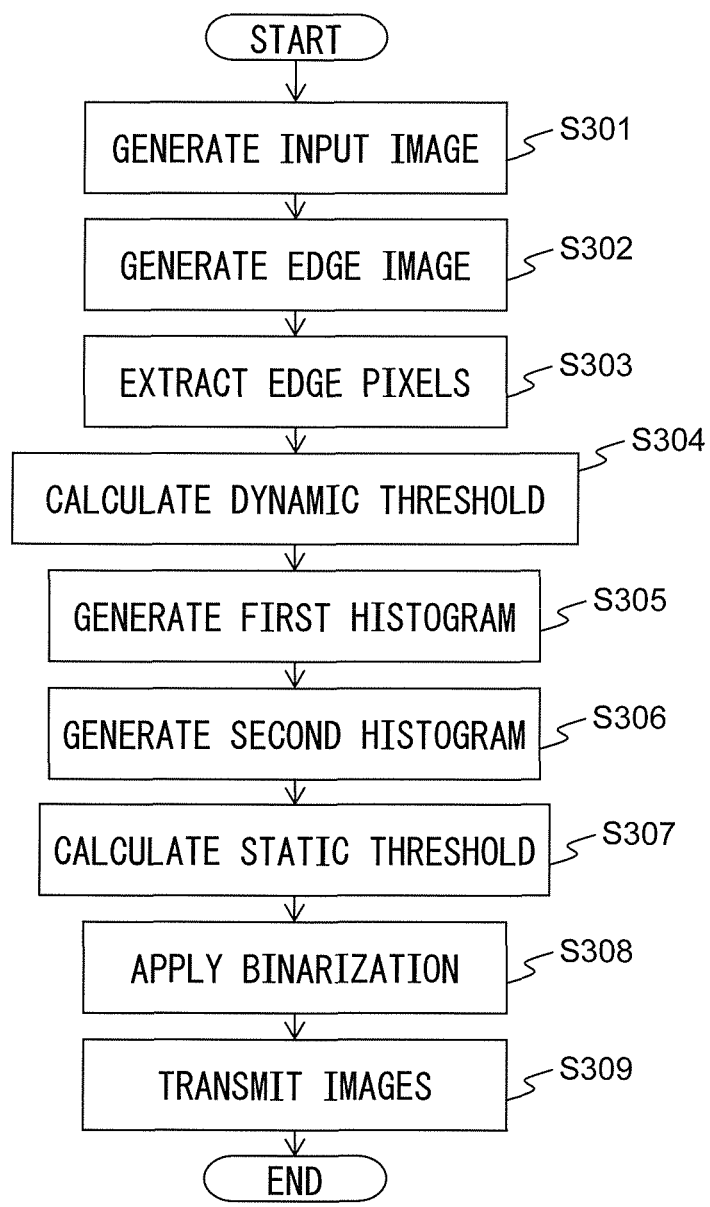

PFUグループは、「技術と信頼のPFU」のスローガンのもと、優れた商品(Product)と、確かなものづくり(Factory)を通じてお客様の利便性(Utility)に寄与することを目標として掲げています。
近年、ITシステムはお客様の経営にとってますます重要度を増すとともに、より高度化・複雑化してきております。

当社は、世界No.1シェアのドキュメントスキャナ、多数の出荷実績を誇る情報KIOSK端末をはじめ、ITベンダーとして蓄積した技術を結集させた「ProDeS(開発製造サービス)」で、お客様のご要望にお応えしたハードウェアをご提供しています。

さらに、セキュリティ・文書管理などのソフトウェア、ITインフラ構築やECM(Enterprise Content Management)パッケージを利用したソリューション、および50社以上の企業と提携したマルチベンダーサービスまで行っております。

「IT-LCE(IT Lifecycle Evolution)～お客様と共に進化するPFU～」を経営方針に掲げ、当社が持つ「ハード、ソフト、サービスの先進技術」をワンストップで提供することで、お客様のビジネスを支援いたします。

PFUはこれからも、お客様のビジネス、人々の生活がより豊かになるような製品・サービスを提供すべく、研鑽に努め、我々自身も進化していく所存です。

イメージスキャナの領域で世界シェア50%を誇るPFUでは、1982年に開発に着手して以来、さまざまな新技術の開発に取り組み、お客様

イメージスキャナの領域で世界シェア50%を誇るPFUでは、1982年に開発に着手して以来、さまざまな新技術の開発に取り組み、お客様

FIG.16A

| 型名 | | FI-5950 |
|---|---|---|
| スキャナタイプ | | |
| スキャニングモード | | 片面/両面、カラー/グレースケール/モノクロ2値(バイナリ) |
| イメージセンサー | | カラーCCD 2(表面 1、裏面 1) |
| 光源 | | 白色冷陰極蛍光放電管 4(表面 2、裏面 2) |
| 読取範囲 | | 最大: A3縦(297mm 420mm)、12in. 17in. |
| 原稿の厚さ | | 31〜209g/m2、B4サイズ以上は52〜157g/m2 |
| 読取範囲速度 | カラー | [A4横] |
| | グレースケール | 片面: 135枚/分(200dpi/300dpi) |
| | | 両面: 270面/分(200dpi/300dpi)(注3) |
| | モノクロ2値 | [A4縦] |
| | | 片面: 105枚/分(200dpi/300dpi)(注4) |
| | | 両面: 210面/分(200dpi/300dpi)(注4) |
| 原稿搭載容量(A4横) | | 500枚 (A4: 80g/m²) |
| 原稿背景色 | | 白または黒 (コマンド切替可) |
| 出力解像度 | カラー(24bit) | |
| | グレースケール(8bit) | 50〜600dpi(1dpi毎指定可能) |
| | モノクロ2値(1bit) | |

FIG.16B

| 型名 | | FI-5950 |
|---|---|---|
| スキャナタイプ | | |
| スキャニングモード | | 片面/両面、カラー/グレースケール/モノクロ2値(バイナリ) |
| イメージセンサー | | カラーCCD 2(表面 1、裏面 1) |
| 光源 | | 白色冷陰極蛍光放電管 4(表面 2、裏面 2) |
| 読取範囲 | | 最大: A3縦(297mm 420mm)、12in. 17in. |
| 原稿の厚さ | | 31〜209g/m2、B4サイズ以上は52〜157g/m2 |
| 読取範囲速度 | カラー | [A4横] |
| | グレースケール | 片面: 135枚/分(200dpi/300dpi) |
| | | 両面: 270面/分(200dpi/300dpi)(注3) |
| | モノクロ2値 | [A4縦] |
| | | 片面: 105枚/分(200dpi/300dpi)(注4) |
| | | 両面: 210面/分(200dpi/300dpi)(注4) |
| 原稿搭載容量(A4横) | | 500枚 (A4: 80g/m²) |
| 原稿背景色 | | 白または黒 (コマンド切替可) |
| 出力解像度 | カラー(24bit) | |
| | グレースケール(8bit) | 50〜600dpi(1dpi毎指定可能) |
| | モノクロ2値(1bit) | |

IMAGE PROCESSING APPARATUS, IMAGE PROCESSING METHOD, AND COMPUTER-READABLE, NON-TRANSITORY MEDIUM

CROSS-REFERENCE TO RELATED APPLICATIONS

This application is based upon and claims the benefit of priority of prior Japanese Patent Application No. 2011-178855, filed on Aug. 18, 2011, the entire contents of which are incorporated herein by reference.

TECHNICAL FIELD

Embodiments discussed in the present specification relate to image processing technology.

BACKGROUND

Generally, when performing prescribed processing by extracting information such as characters from a document, binarization is applied to the image representing the document in order to differentiate the character areas from other areas corresponding to the background.

There is proposed, for example, in Japanese Laid-open Patent Publication No. 2007-28362, a check reading apparatus which extracts only character areas from image data acquired of a document such as a check. The proposed check reading apparatus creates a histogram representing the density distribution in the image data acquired by scanning the document, sets a binarization threshold between a crest appearing in a high-density region and a crest appearing in a low-density region, and performs binarization using the thus set binarization threshold. However, in the case of a document where the luminance of the background area varies from position to position, for example, the background differs for each given area or varies in gradation, there have been cases where the high-density region and the low-density region cannot be distinctly separated from each other in the histogram of the image data density distribution, resulting in an inability to properly set the binarization threshold.

In view of this, in Japanese Patent No. 4077094, there is proposed a color document image recognition apparatus that uses a different binarization threshold for each sub-region within the document image. The proposed color document image recognition apparatus applies edge detection to the grayscale image acquired from the document image, and extracts each sub-region based on the connected components of the detected edge pixels. The color document image recognition apparatus then determines a binarization threshold for each sub-region and performs binarization. In this case, the color document image recognition apparatus sets all regions, other than the sub-region, as the background.

On the other hand, in Japanese Laid-open Patent Publication No. 06-113139, there is proposed an image binarizing apparatus which divides an input image into blocks and determines a different binarization threshold for each block. The proposed image binarizing apparatus divides the input image into a plurality of sub-images. Then, the image binarizing apparatus generates a histogram of the lightness levels of a sub-image of interest and its eight neighboring sub-images, enters the generated histogram data into a neural network trained in advance, and binarizes the sub-image of interest by using the output value of the neural network as the binarization threshold.

SUMMARY

The color document image recognition apparatus disclosed in Japanese Patent No. 4077094, which determines the binarization threshold for each sub-region, can perform binarization with good accuracy even in the case of a document where the luminance of the background area varies from position to position. However, in the color document image recognition apparatus disclosed in Japanese Patent No. 4077094, since all regions other than the sub-region are set as the background when performing the binarization, there has been the possibility that the apparatus may not be able to extract characters if the luminance difference between the character area and the background area is so small that edge pixels cannot be extracted.

The image binarizing apparatus disclosed in Japanese Laid-open Patent Publication No. 06-113139, which determines the binarization threshold for each given block, can also perform binarization with good accuracy even in the case of a document where the luminance of the background area varies from position to position. However, in the image binarizing apparatus disclosed in Japanese Laid-open Patent Publication No. 06-113139, since the binarization threshold is predicted based on the results learned in advance, there have been cases where the binarization threshold may not be set properly, depending on the input image.

Accordingly, it is an object of the present invention to provide an image processing apparatus and image processing method that can binarize the input image so that the characters can be differentiated with high accuracy from the background area, and a computer-readable, non-transitory medium storing a computer program for causing a computer to implement such an image processing method.

According to an aspect of the apparatus, there is provided an image processing apparatus. The image processing apparatus includes an edge pixel extractor for extracting edge pixels from an input image, a first histogram generator for generating a first histogram based on a luminance value of each of the edge pixels, a second histogram generator for generating a second histogram based on a minimum luminance value among the luminance values of pixels neighboring each of the edge pixels, a static threshold calculator for obtaining a static threshold based on the first histogram and the second histogram, and a binarization unit for binarizing the input image by using the static threshold.

According to an aspect of the method, there is provided an image processing method. The image processing method includes extracting edge pixels from an input image, generating a first histogram based on a luminance value of each of the edge pixels, generating a second histogram based on a minimum luminance value among the luminance values of pixels neighboring each of the edge pixels, obtaining, using a computer, a static threshold based on the first histogram and the second histogram, and binarizing the input image by using the static threshold.

According to an aspect of the computer-readable, non-transitory medium storing a computer program, the computer program causes a computer to execute a process, including extracting edge pixels from an input image, generating a first histogram based on a luminance value of each of the edge pixels, generating a second histogram based on a minimum luminance value among the luminance values of pixels neighboring each of the edge pixels, obtaining a static threshold based on the first histogram and the second histogram, and binarizing the input image by using the static threshold.

According to the image processing apparatus and the image processing method, and the computer-readable, non-transitory medium, it is possible to binarize the input image so that the characters can be differentiated with high accuracy from the background area.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 3 is a flowchart illustrating the sequence of operations performed in an image reading apparatus to implement a binarization process.

FIG. 11 is a diagram showing one example of a binarized image generated by binarizing the input image of FIG. 7.

FIG. 12 is a diagram showing one example of a binarized image generated by binarizing the input image of FIG. 9.

FIG. 16A is a diagram showing still another example of the input image and its binarized image.

FIG. 16B is a diagram showing still another example of the input image and its binarized image.

DESCRIPTION OF EMBODIMENTS

An image processing apparatus, an image processing method, and a computer program will be described below with reference to the drawings. It will, however, be noted that the technical scope of the invention is not limited to the specific embodiments disclosed herein, but extends to the inventions described in the appended claims and their equivalents.

Figure 1:
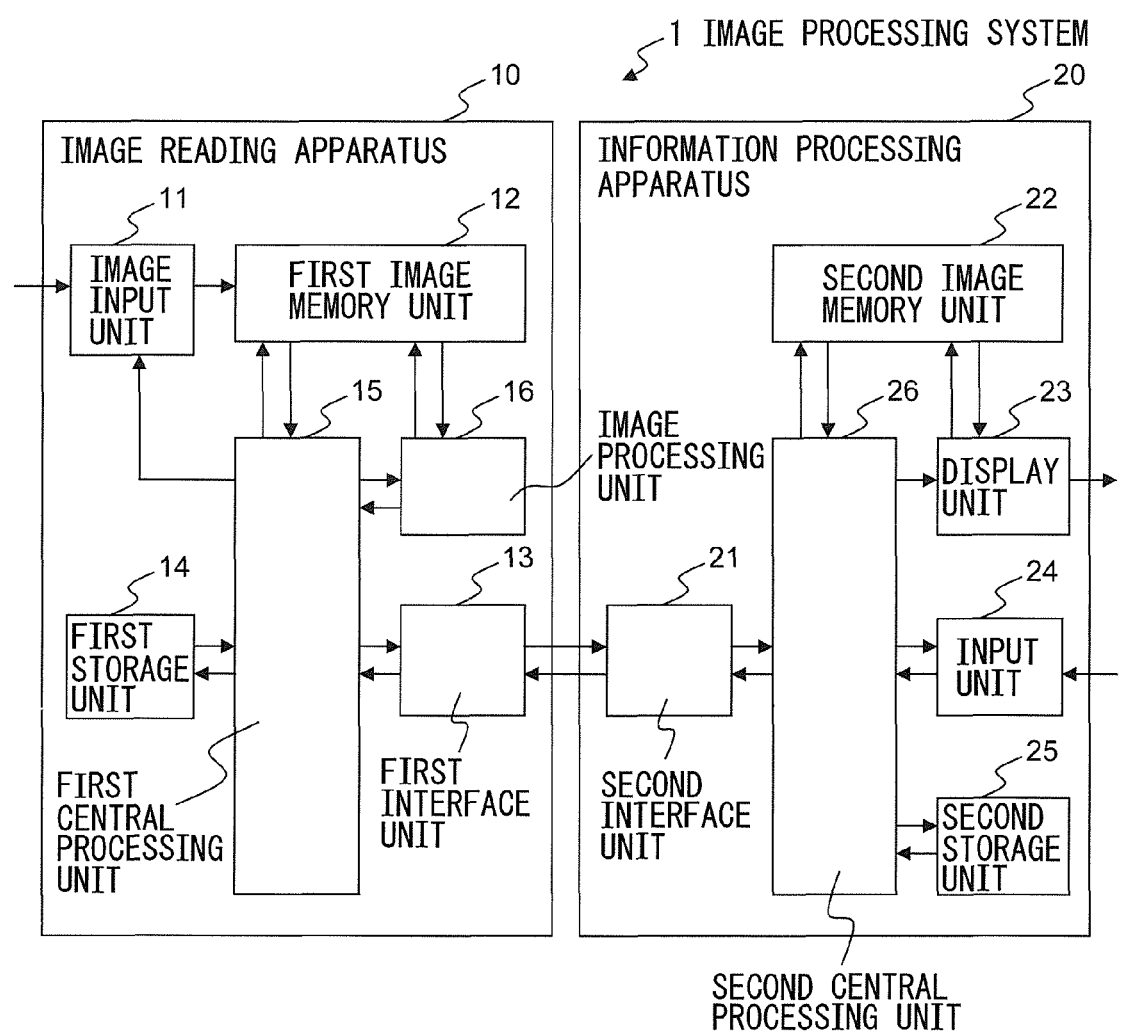
FIG. 1 is a diagram schematically illustrating the configuration of an image processing system.

FIG. 1 is a diagram schematically illustrating the configuration of an image processing system. As illustrated in FIG. 1, the image processing system 1 includes an image reading apparatus 10 and an information processing apparatus 20. The image reading apparatus 10 is, for example, an image scanner, a digital camera, or the like, and the information processing apparatus 20 is, for example, a personal computer or the like which is used for connection to the image reading apparatus 10.

The image reading apparatus 10 includes an image input unit 11, a first image memory unit 12, a first interface unit 13, a first storage unit 14, a first central processing unit 15, and an image processing unit 16. The various units constituting the image reading apparatus 10 will be described in detail below.

The image input unit 11 includes an image sensor for capturing an image of a subject such as a document, a scene, a person, or the like. The following description will be given by assuming that the subject whose image is to be captured is a document. The image sensor includes imaging devices, such as CCD or CMOS devices, arranged in a one-dimensional or two-dimensional array, and optics for focusing the image of the subject onto the imaging devices. Each imaging device outputs an analog value corresponding to each RGB color. The image input unit 11 generates pixel data by converting each of the analog values output from the image sensor into a digital value, and generates image data (hereinafter referred to as the RGB image) constructed from the pixel data. The RGB image provides color image data represented by a total of 25 bits of RGB values with each pixel data represented by 8 bits for each RGB color.

Then, the image input unit 11 generates an image (hereinafter referred to as the input image) by converting the RGB value of each pixel in the RGB image into a luminance value and a color difference value (YUV values), and stores the input image in the first image memory unit 12. The YUV values can be calculated, for example, from the following equations.

$$Y \text{ value} = 0.30 \times R \text{ value} + 0.59 \times G \text{ value} + 0.11 \times B \text{ value} \quad (1)$$

$$U \text{ value} = -0.17 \times R \text{ value} - 0.33 \times G \text{ value} + 0.50 \times B \text{ value} \quad (2)$$

$$V \text{ value} = 0.50 \times R \text{ value} - 0.42 \times G \text{ value} - 0.08 \times B \text{ value} \quad (3)$$

The first image memory unit 12 includes a storage device such as a nonvolatile semiconductor memory, a volatile semiconductor memory, a magnetic disk, etc. The first image memory unit 12 is connected to the image input unit 11 and stores the input image generated by the image input unit 11; the first image memory unit 12 is also connected to the image processing unit 16 and stores various kinds of processed images that the image processing unit 16 produced by applying image processing operations to the input image.

The first interface unit 13 includes an interface circuit conforming to USB or other serial bus architecture, and is electrically connected to the information processing apparatus 10 for transmission and reception of image data and various kinds of information. Further, a flash memory or the like may be connected to the first interface unit 13 so that the image data stored in the first image memory unit 12 may be transferred to the flash memory for storage.

The first storage unit 14 includes a memory device such as a RAM or ROM, a fixed disk device such as a hard disk, or a removable storage device such as an optical disk. The first storage unit 14 stores a computer program, data base, table, etc., which are used by the image reading apparatus 10 to perform various processing operations. The computer program may be installed on the first storage unit 14 from a computer-readable, non-transitory medium such as a compact disk read only memory (CD-ROM), a digital versatile disk read only memory (DVD-ROM), or the like by using a well-known setup program or the like.

The first central processing unit 15 is connected to the image input unit 11, the first image memory unit 12, the first interface unit 13, the first storage unit 14, and the image processing unit 16, and controls these units. The first central processing unit 15 performs control operations such as the control of the input image generation by the image input unit 11, the control of the first image memory unit 12, the control of data transmission and reception to and from the information processing apparatus 20 via the first interface unit 13, the control of the first storage unit 14, and the control of the image processing by the image processing unit 16.

The image processing unit 16 is connected to the first image memory unit 12, and performs binarization by calculating a threshold value for binarizing the input image. The image processing unit 16 is connected to the first central processing unit 15 and performs processing operations under the control of the first central processing unit 15 in accordance with the program prestored in the first storage unit 14. The image processing unit 16 may be constructed from an independent integrated circuit, microprocessor, firmware, or the like.

The information processing apparatus 20 includes a second interface unit 21, a second image memory unit 22, a display unit 23, an input unit 24, a second storage unit 25, and a second central processing unit 26. The various units constituting the information processing apparatus 20 will be described in detail below.

The second interface unit 21 includes an interface circuit similar to the one constituting the first interface unit 13 of the image reading apparatus 10, and connects the information processing apparatus 20 to the image reading apparatus 10.

The second image memory unit 22 includes a storage device similar to the one constituting the first image memory unit 12 of the image reading apparatus 10. The second image memory unit 22 stores the image data received from the image reading apparatus 10 via the second interface unit 21.

The display unit 23 includes a display, such as a liquid crystal display or an organic EL display, and an interface circuit which outputs image data to the display; the display unit 23 is connected to the second image memory unit 22 and displays the image data retrieved from the second image memory unit 22.

The input unit 24 includes an input device, such as a keyboard or a mouse, and an interface circuit which acquires a signal from the input device; the input unit 24 outputs a signal responsive to a user operation performed thereon and supplies the signal to the second central processing unit 26.

The second storage unit 25, similarly to the first storage unit 14 in the image reading apparatus 10, is constructed from a memory device, a fixed disk device, a portable storage device, etc. The second storage unit 25 stores a computer program, data base, table, etc., which are used by the information processing apparatus 20 to perform various processing operations. The computer program may be installed on the second storage unit 25 from a computer-readable, non-transitory medium such as a compact disk read only memory (CD-ROM), a digital versatile disk read only memory (DVD-ROM), or the like by using a well-known setup program or the like.

The second central processing unit 26 is connected to the second interface unit 21, the second image memory unit 22, the display unit 23, the input unit 24, and the second storage unit 25, and controls these units. The second central processing unit 26 performs control operations such as the control of data transmission and reception to and from the image reading apparatus 10 via the second interface unit 21, the control of the second image memory unit 22, the display control for the display unit 23, the input control for the input unit 24, and the control of the second storage unit 25.

Figure 2:
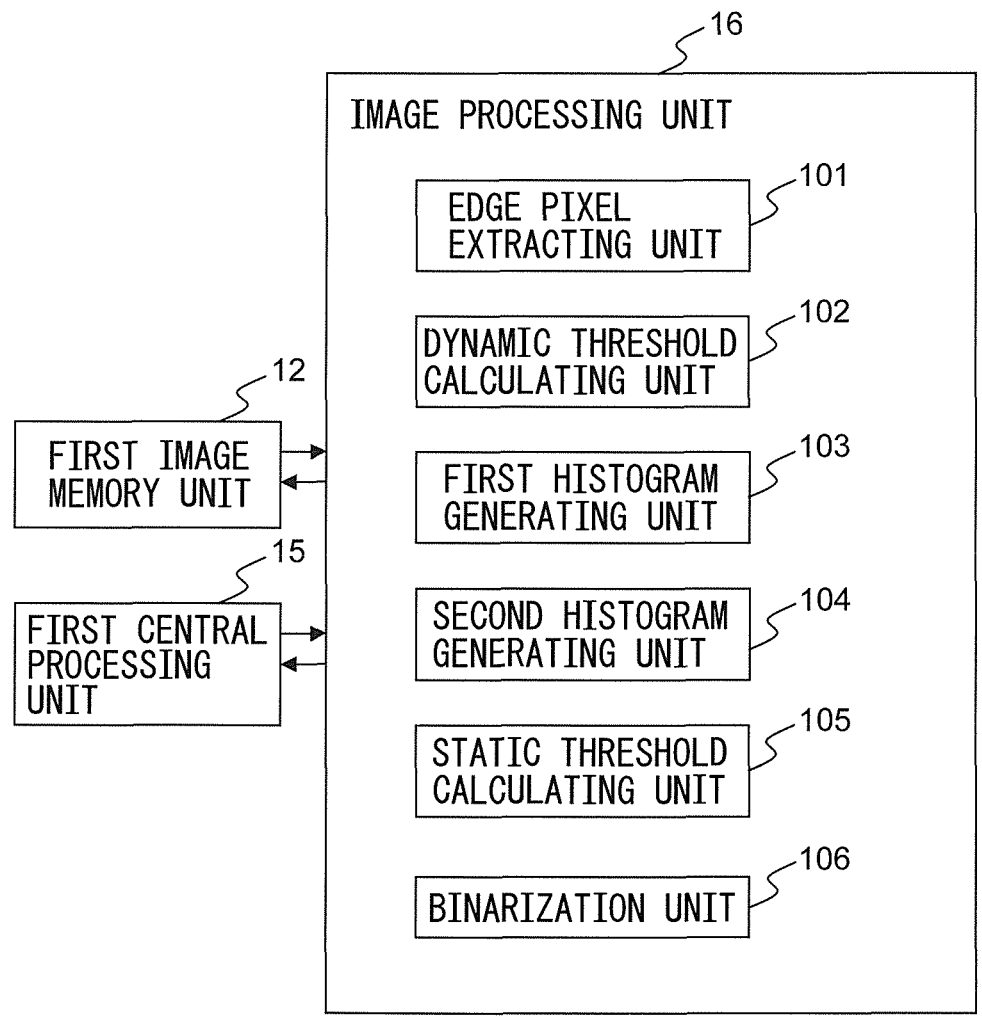
FIG. 2 is a diagram schematically illustrating the configuration of an image processing unit.

FIG. 2 is a diagram schematically illustrating the configuration of the image processing unit 16. As illustrated in FIG. 2, the image processing unit 16 includes an edge pixel extracting unit 101, a dynamic threshold calculating unit 102, a first histogram generating unit 103, a second histogram generating unit 104, a static threshold calculating unit 105, and a binarization unit 106.

FIG. 3 is a flowchart illustrating the sequence of operations performed in the image reading apparatus 10 to implement the threshold calculation and binarization process. The sequence of operations for implementing the threshold calculation and binarization process will be described below with reference to the flowchart of FIG. 3. The operation flow described hereinafter is executed primarily by the first central processing unit 15 in collaboration with the various component elements of the image reading apparatus 10 in accordance with the program prestored in the first storage unit 14.

First, the image input unit 11 generates an input image by capturing an image of the subject (document), and stores the input image in the first image memory unit 12 (step S301).

Next, the edge pixel extracting unit 101 recovers the luminance component of the input image stored in the first image memory unit 12 (an image formed by the luminance component of the input image will hereinafter be referred to as the luminance image), applies edge detection such as second-order differential filtering to each pixel in the luminance image, and generates an edge image by taking each output value as a pixel value (step S302). An example of the second-order differential filtering applied by the edge pixel extracting unit 101 is shown below.

[MATHEMATICAL 1]

$$\text{second-order differential filtering} = \begin{bmatrix} -1 & -1 & -1 \\ -1 & 8 & -1 \\ -1 & -1 & -1 \end{bmatrix} \quad (4)$$

Since the output value of the second-order differential filtering tends to be strongly affected by noise, the edge pixel extracting unit 101 may reduce the effect of noise by further applying smoothing filtering such as median filtering or Gaussian filtering to each pixel in the edge image.

Next, the edge pixel extracting unit 101 extracts edge pixels from the luminance image by using the edge image (step S303).

Figure 4A:
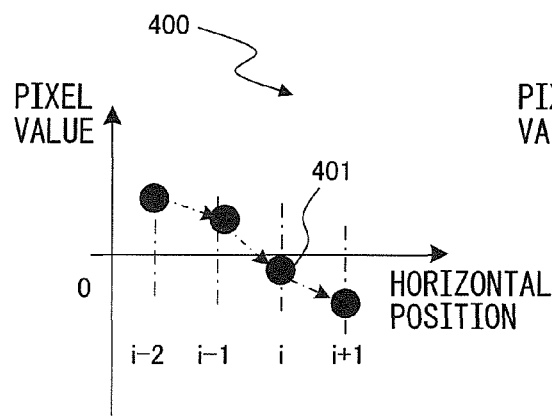
FIG. 4A is a schematic diagram for explaining an edge pixel extraction process.
Figure 4C:
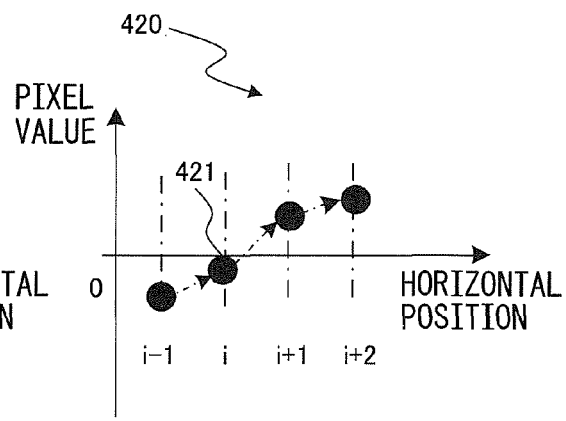
FIG. 4C is a schematic diagram for explaining an edge pixel extraction process.
Figure 4B:
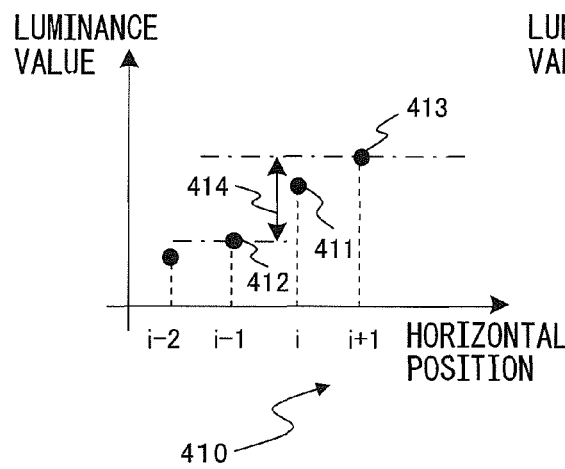
FIG. 4B is a schematic diagram for explaining an edge pixel extraction process.
Figure 4D:
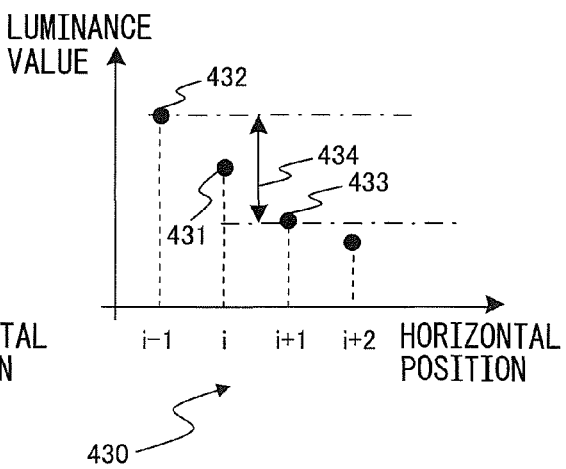
FIG. 4D is a schematic diagram for explaining an edge pixel extraction process.

FIGS. 4A to 4D are diagrams for explaining the edge pixel extraction. Graphs 400 and 420 in FIGS. 4A and 4C show the pixel values of horizontally adjacent pixels in the edge image, and graphs 410 and 430 in FIGS. 4B and 4D show the luminance values of the pixels in the luminance image that correspond to the respective pixels in the edge image. The abscissa in each of the graphs 400 and 420 represents the horizontal position on the edge image, and the ordinate represents the pixel value. On the other hand, the abscissa in each of the graphs 410 and 430 represents the horizontal position on the luminance image, and the ordinate represents the luminance value.

First, from among the horizontally adjacent pixels in the edge image each of whose pixel values changes sign from positive to negative or from negative to positive, the edge pixel extracting unit 101 extracts pixels 401 and 421 each of whose pixel values is negative. Next, the edge pixel extracting unit 101 calculates absolute differences 414 and 434 (each hereinafter referred to as the adjacent pixel difference value), the former representing the absolute difference in luminance value between the pixels 412 and 413 horizontally adjacent on both sides of the pixel 411 in the luminance image and the latter the absolute difference in luminance value between the pixels 432 and 433 horizontally adjacent on both sides of the pixel 431 in the luminance image, the pixels 411 and 431 corresponding to the extracted edge pixels 401 and 421, respectively. Then, the edge pixel extracting unit 101 determines whether the thus calculated adjacent pixel difference value exceeds a threshold value Wth and, if the adjacent pixel difference value exceeds the threshold value Wth, then extracts the corresponding pixel in the luminance image as a horizontal edge pixel. The threshold value Wth here may be set, for example, equal to the minimum difference in luminance value (for example, to 20) with which the human eye can perceive a difference in luminance on the image. The edge pixel extracting unit 101 also extracts vertical edge pixels by performing processing operations, similar to those described above, in the vertical direction across the edge image and the luminance image. Then, the edge pixel extracting unit 101 determines that any pixel detected as either a horizontal edge pixel or a vertical edge pixel is an edge pixel. Alternatively, any pixel detected as both a horizontal edge pixel and a vertical edge pixel may be determined as an edge pixel.

Next, the dynamic threshold calculating unit 102 calculates a threshold (hereinafter referred to as the dynamic threshold) for binarizing the edge pixel and the pixels located within a predetermined range of the edge pixel in the luminance image (such pixels will hereinafter be referred to as the neighboring pixels) (step S304).

When the luminance of the background area varies depending on the position on the input image, it is preferable to set the binarization threshold for each region neighboring the character area, that is, for each region containing an edge pixel and its neighboring pixels, in order to properly differentiate the character area from the background area. In view of this, the dynamic threshold calculating unit 102 calculates the dynamic threshold for each region containing an edge pixel and its neighboring pixels.

Figure 5:
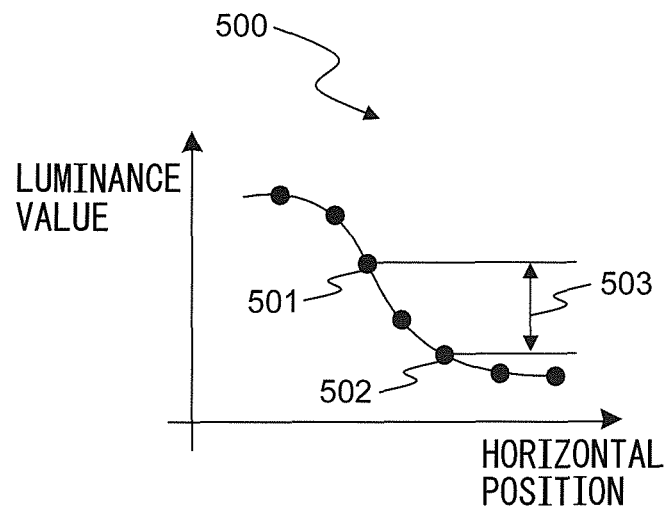
FIG. 5 is a diagram for explaining a dynamic threshold calculation process.

FIG. 5 is a diagram for explaining the calculation of the dynamic threshold. Graph 500 in FIG. 5 shows the luminance values of horizontally adjacent pixels in the luminance image. The abscissa in the graph 500 represents the horizontal position on the luminance image, and the ordinate represents the luminance value. In the graph 500, the pixel 501 is extracted as an edge pixel, and the luminance of any other pixel decreases (the pixel becomes darker) as its horizontal position is farther away to the right, and increases (the pixel becomes lighter) as its horizontal position is farther away to the left. In this case, if the character area and the background area are to be correctly differentiated in the neighborhood region of the edge pixel 501, it is preferable to set the dynamic threshold at a point 503 somewhere between the luminance value of a pixel 502 having a sufficiently low luminance value among the pixels forming the edge portion and the luminance value of the edge pixel 501 so that the pixel 502 can be differentiated from other pixels whose luminance is higher than the pixel 502. In view of this, the dynamic threshold calculating unit 102 sets the dynamic threshold at a point somewhere between the luminance value of the edge pixel 501 and the luminance value of the pixel having the lowest luminance value (hereinafter referred to as the minimum luminance value) among the pixels neighboring the edge pixel. For example, the dynamic threshold calculating unit 102 determines the dynamic threshold by taking an average value between the luminance value of the edge pixel and the minimum luminance value of the pixels neighboring the edge pixel.

Alternatively, the dynamic threshold calculating unit 102 may determine the dynamic threshold by taking the sum of the luminance value of the edge pixel and the minimum luminance value of the pixels neighboring the edge pixel with each value multiplied by a predetermined weighting factor. In this case, each weighting factor is entered in advance, for example, by the user by using the input unit 24 of the information processing apparatus 20. Then, the second central processing unit 26 in the information processing apparatus 20 passes thus entered weighting factors to the second interface unit 21 for transmission to the image reading apparatus 10. The first central processing unit 15 in the image reading apparatus 10 receives the weighting factors and stores the received weighting factors in the first image memory unit 12, and the dynamic threshold calculating unit 102 calculate the dynamic threshold by using the weighting factors stored in the first image memory unit 12.

Figure 6A:
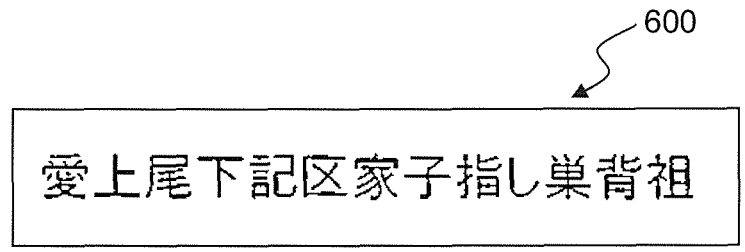
FIG. 6A is a diagram showing binarized images generated using different dynamic threshold values.
Figure 6B:
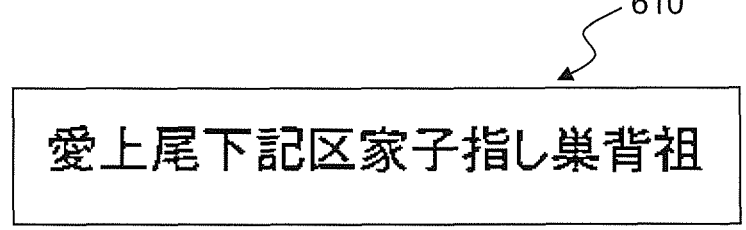
FIG. 6B is a diagram showing binarized images generated using different dynamic threshold values.

FIGS. 6A and 6B are diagrams for explaining the difference between binarized images generated using different dynamic threshold values. FIG. 6A shows the binarized image 600 generated when a greater weight is applied to the minimum luminance value of the pixels neighboring the edge pixel than the weight applied to the luminance value of the edge pixel. In this case, the dynamic threshold becomes closer to the minimum luminance value of the pixels neighboring the edge pixel, and the dynamic threshold calculating unit 102 can thus make the characters thinner in the binarized image 600 generated using this dynamic threshold. On the other hand, FIG. 6B shows the binarized image 610 generated when a greater weight is applied to the luminance value of the edge pixel than the weight applied to the minimum luminance value of the pixels neighboring the edge pixel. In this case, the dynamic threshold becomes closer to the luminance value of the edge pixel, and the dynamic threshold calculating unit 102 can thus make the characters thicker in the binarized image 610 generated using this dynamic threshold.

The neighboring pixels here are, for example, the 3×3 pixels with the edge pixel of interest at its center but excluding the edge pixel itself. Alternatively, the neighboring pixels may be the 5×5 pixels or 7×7 pixels with the edge pixel of interest at its center but excluding the edge pixel itself. As the range of the neighboring pixels becomes larger, the computational burden associated with the dynamic threshold calculation increases, but it becomes possible to correctly differentiate the character area and the background area from each other in the binarization process.

When a certain edge pixel or a pixel neighboring that edge pixel is also a pixel neighboring another edge pixel, the dynamic threshold calculating unit 102 determines the dynamic threshold for such a pixel by taking the average value between the dynamic threshold values calculated for the respective edge pixels.

Next, the first histogram generating unit 103 generates a histogram (a first histogram) based on the luminance value of each edge pixel (step S305).

Next, the second histogram generating unit 104 extracts neighboring pixels for each edge pixel in the luminance image, and generates a histogram (a second histogram) based on the minimum luminance value of the extracted neighboring pixels (step S306).

The range of the neighboring pixels that the second histogram generating unit 104 extracts is of the same size as the range of the neighboring pixels that the dynamic threshold calculating unit 102 extracts. Alternatively, the range of the neighboring pixels that the second histogram generating unit 104 extracts may be made different in size from the range of the neighboring pixels that the dynamic threshold calculating unit 102 extracts.

Figure 7:
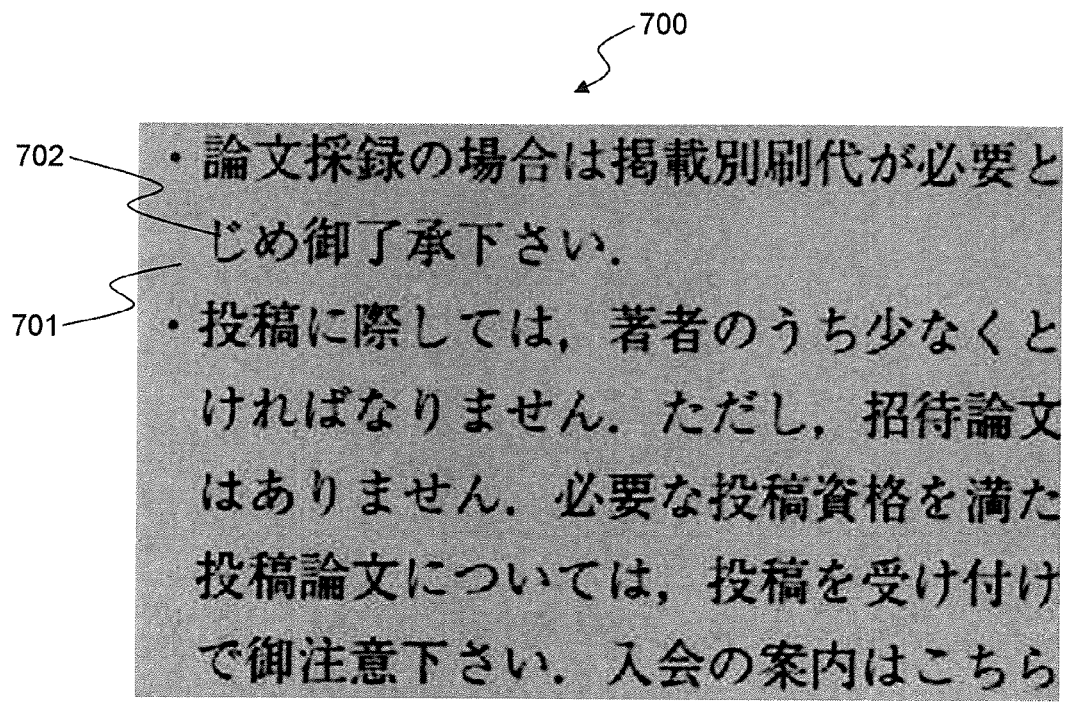
FIG. 7 is a diagram showing one example of an input image.

FIG. 7 shows one example of the input image. The input image 700 of FIG. 7 shows characters 702 on a background 701 represented by a single luminance value.

Figure 8:
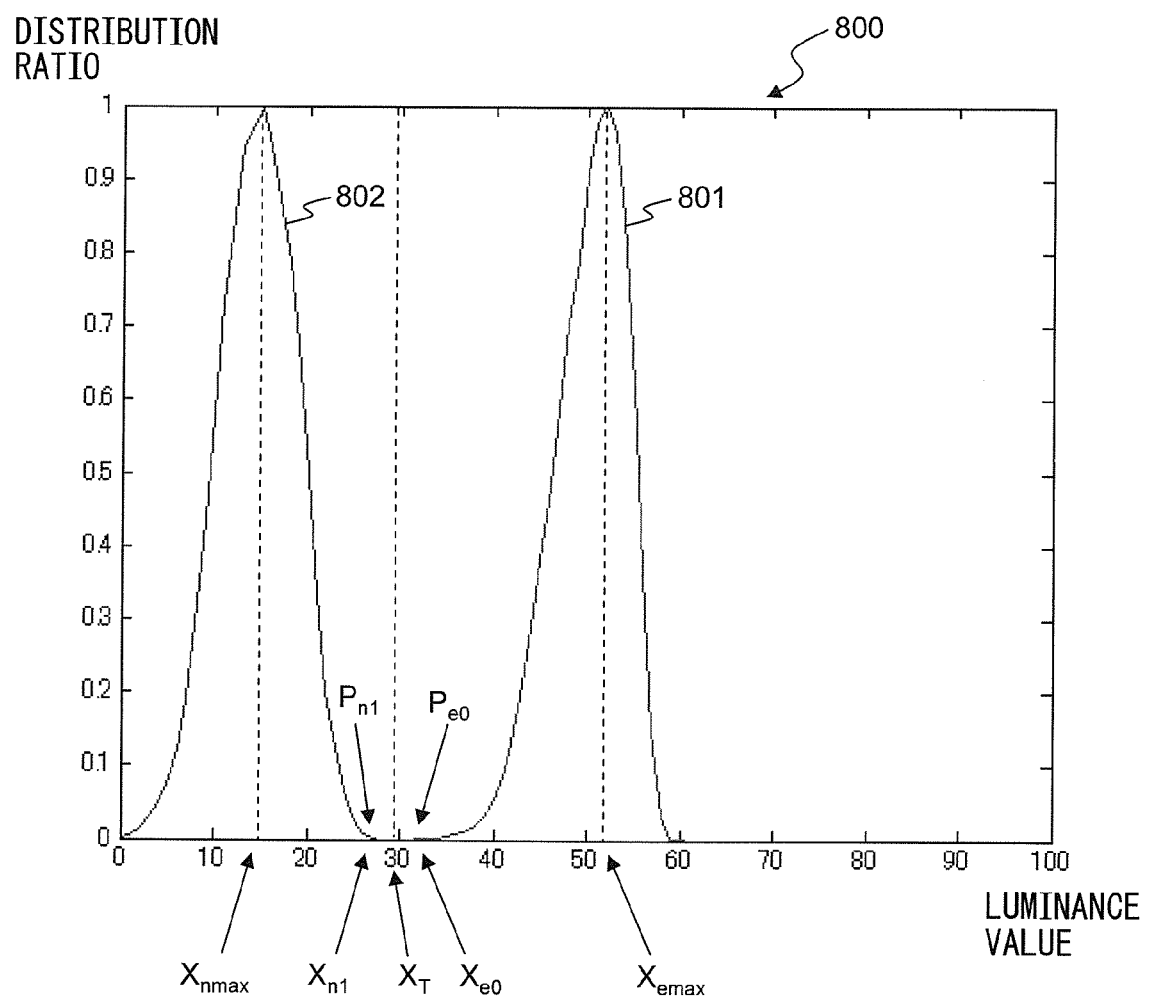
FIG. 8 is a diagram showing examples of a first histogram and a second histogram.

FIG. 8 is a diagram showing examples of the first histogram and the second histogram generated from the input image 700 of FIG. 7. In FIG. 8, the abscissa represents the luminance value of each edge pixel or each neighboring pixel of the edge pixel, and the ordinate represents the distribution ratio in each histogram normalized so that the maximum value of the distribution value (distribution number) of the histogram is 1. In the graph 800 shown in FIG. 8, graph 801 corresponds to the first histogram, and graph 802 corresponds to the second histogram. The first histogram generated based on each edge pixel is distributed between the luminance value of the gray background 701 and the luminance value of the black characters 702, while the second histogram generated based on the minimum luminance value of the pixels neighboring each edge pixel is distributed in the vicinity of the luminance value of the black characters 702.

Figure 9:
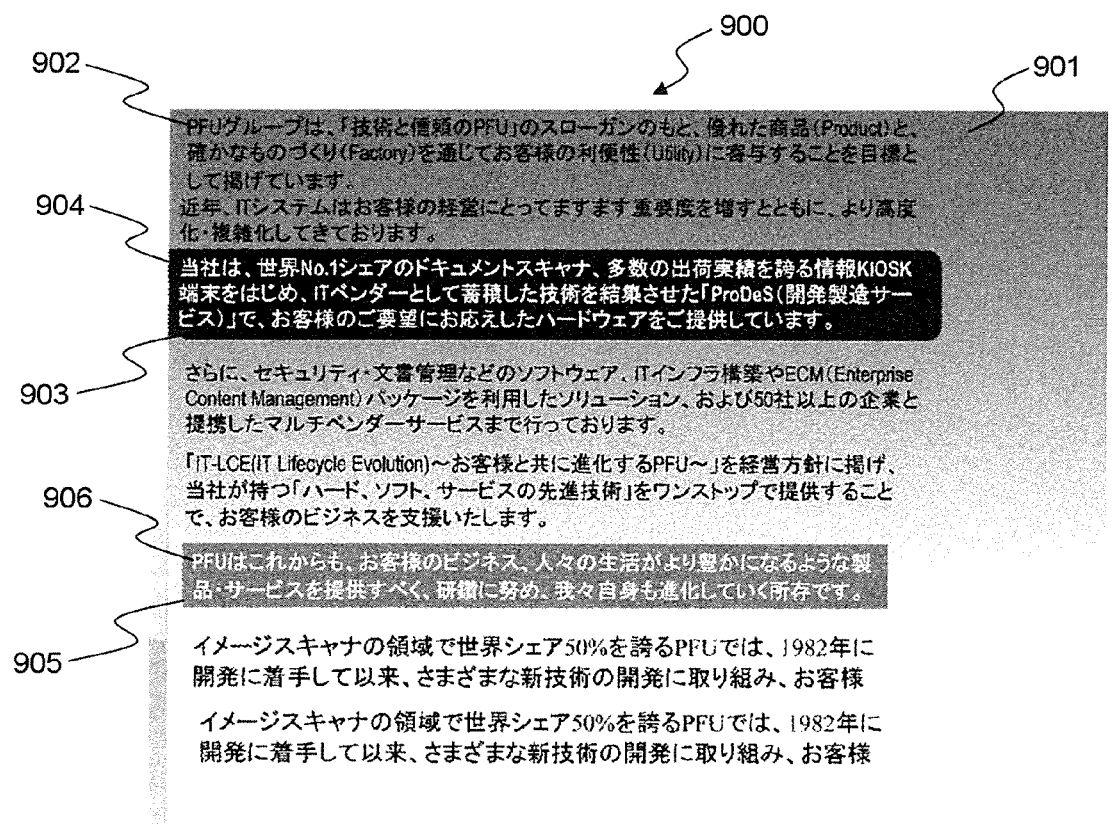
FIG. 9 is a diagram showing another example of the input image.

FIG. 9 shows another example of the input image. The input image 900 of FIG. 9 shows black characters 902 on a background 901 whose luminance varies in gradation, and white characters 904 and 906 on a black background 903 and a gray background 905, respectively.

Figure 10:
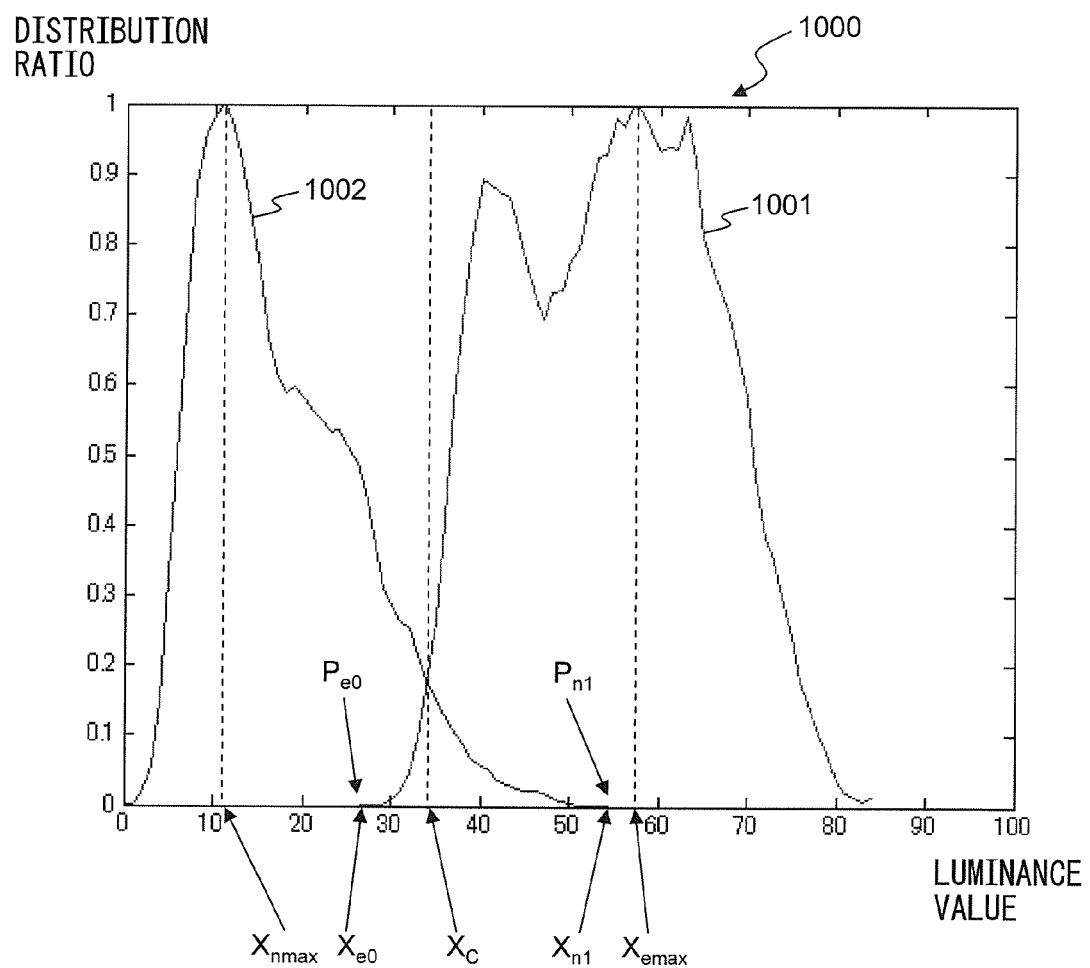
FIG. 10 is a diagram showing examples of the first histogram and the second histogram.

FIG. 10 is a diagram showing examples of the first histogram and the second histogram generated from the input image 900 of FIG. 9. In FIG. 10, the abscissa represents the luminance value of each edge pixel or each neighboring pixel of the edge pixel, and the ordinate represents the distribution ratio in each histogram normalized so that the maximum value of the distribution value (distribution number) of the histogram is 1. In the graph 1000 shown in FIG. 10, graph 1001 corresponds to the first histogram, and graph 1002 corresponds to the second histogram. Because of the variety of combinations between the character luminance value and the background luminance value in the input image 900, the first and second histograms shown in the graph 1000 are respectively distributed over a wider range than the first and second histograms shown in the graph 800 of FIG. 8.

Next, the static threshold calculating unit 105 calculates a threshold (hereinafter referred to as the static threshold) for binarizing the pixels other than the edge pixel and its neighboring pixels (step S307).

The calculation of the static threshold will be described below. As earlier described, for the edge pixel and its neighboring pixels, the dynamic threshold for each region containing the edge pixel and its neighboring pixels has been set somewhere between the luminance value of the edge pixel and the minimum luminance value of its neighboring pixels. On the other hand, when the luminance of the background area varies depending on the position on the input image, in order to properly binarize the background area it is preferable that the static threshold for the pixels other than the edge pixel and its neighboring pixels is set somewhere between the luminance value of a pixel having a sufficiently low luminance value among the pixels forming the edge portion and the luminance value of a pixel having a higher luminance value than such a low-luminance pixel. Accordingly, the static threshold calculating unit 105 sets the static threshold somewhere between the luminance value $X_{emax}$ where the distribution ratio in the first histogram is the largest and the luminance value $X_{nmax}$ where the distribution ratio in the second histogram is the largest.

For example, the static threshold calculating unit 105 obtains a converging point $P_{e0}$ on the low-luminance side of the distribution of the first histogram and a converging point $P_{n1}$ on the high-luminance side of the distribution of the second histogram. The static threshold calculating unit 105 determines the converging point $P_{e0}$, for example, by taking a point representing the luminance value at or blow which the distribution ratio in the first histogram drops to or below a predetermined rate Th0, and the converging point $P_{n1}$ by taking a point representing the luminance value at or above which the distribution ratio in the second histogram drops to or below the predetermined rate Th0. The predetermined rate Th0 may be set, for example, to 0.01. Then, when the luminance value $X_{e0}$ at the converging point $P_{e0}$ is equal to or higher than the luminance value $X_{n1}$ at the converging point $P_{n1}$, as shown in the graph 800 of FIG. 8, an average value $X_T$ taken between the luminance value $X_{e0}$ and the luminance value $X_{n1}$ is determined as the static threshold. Alternatively, in this case, an arbitrary point between the luminance value $X_{e0}$ and the luminance value $X_{n1}$ may be taken as the static threshold; for example, a weighted average value taken between the luminance value $X_{e0}$ and the luminance value $X_{n1}$, or either the luminance value $X_{e0}$ or the luminance value $X_{n1}$ itself may be determined as the static threshold. On the other hand, when the luminance value $X_{e0}$ at the converging point $P_{e0}$ is lower than the luminance value $X_{n1}$ at the converging point $P_{n1}$, as shown in the graph 1000 of FIG. 10, the luminance value $X_C$ at the point where the first histogram intersects the second histogram is determined as the static threshold. Alternatively, in this case, an arbitrary point between the luminance value $X_C$ and the luminance value $X_{nmax}$ where the distribution ratio in the second histogram is the largest may be taken as the static threshold; for example, either an average value taken between the luminance value $X_C$ and the luminance value $X_{nmax}$, or a weighted average value taken between the luminance value $X_C$ and the luminance value $X_{nmax}$, or the luminance value $X_{nmax}$ itself may be determined as the static threshold. Since the characters are often shown in black, the closer the static threshold is to the converging point $P_{n1}$ on the high-luminance side of the distribution ratio in the second histogram, the more clearly the character area can be differentiated from other areas in the binarization process.

When the dynamic threshold has been determined by the dynamic threshold calculating unit 102, and the static threshold by the static threshold calculating unit 105, the binarization unit 106 reads out the luminance image from the first image memory unit 12, applies binarization to the luminance image, and stores the binarized image in the first image memory unit 12 (step S308).

In this case, for each edge pixel and its neighboring pixels in the luminance image, the binarization unit 106 performs binarization using the corresponding dynamic threshold, and for the pixels other than the edge pixel and its neighboring pixels, the binarization unit 106 performs binarization using the static threshold.

FIG. 11 shows one example of a binarized image generated by binarizing the input image 700 of FIG. 7. FIG. 11 shows the binarized image 1100 generated when the static threshold is set somewhere between the luminance value of the background 701 and the luminance value of the characters 702. In this case, for regions neighboring the characters 702, the binarization unit 106 binarizes the edge portions to black and other portions than the edge portions to white by using the dynamic threshold, and for regions other than the areas neighboring the characters 702, the binarization unit 106 binarizes all such other regions to white by using the static threshold.

FIG. 12 shows one example of a binarized image generated by binarizing the input image 900 of FIG. 9. FIG. 12 shows the binarized image 1200 generated when the static threshold is set somewhere between the luminance value of the black characters 902 and the luminance value of the lowest luminance pixel (the darkest pixel) in the background 901 whose luminance varies in gradation. In this case, for regions neighboring the black characters 902, the binarization unit 106 binarizes the edge portions to black and other portions than the edge portions to white by using the dynamic threshold, and for regions in the background 901 other than the regions neighboring the black characters 902, the binarization unit 106 binarizes all such other regions to white by using the static threshold. On the other hand, for regions neighboring the white characters 904, the binarization unit 106 binarizes the edge portions to black and other portions than the edge portions to white by using the dynamic threshold, and for regions in the black background 903 other than the regions neighboring the white characters 904, the binarization unit 106 binarizes all such other regions to black by using the static threshold. Further, for regions neighboring the white characters 906, the binarization unit 106 binarizes the edge portions to black and other portions than the edge portions to white by using the dynamic threshold, and for regions in the gray background 905 other than the regions neighboring the white characters 906, the binarization unit 106 binarizes all such other regions to white by using the static threshold.

In this way, the binarization unit 106 can extract only the character portions with good accuracy, even when the input image 900 contains the background 901 whose luminance varies in gradation or contains the plurality of backgrounds 903 and 905 having different luminance values.

Next, the first central processing unit 15 transmits the input image and the binarized image, both stored in the first image memory unit 12, to the information processing apparatus 20 via the first interface unit 13 (step S309), and then terminates the series of steps.

In the information processing apparatus 20, when the input image and the binarized image transmitted from the image reading apparatus 10 are received via the second interface unit 21, the second central processing unit 26 stores the received input image and binarized image in the second image memory unit 22 by associating them with each other. Then, the second central processing unit 26 displays the input image and the binarized image on the display unit 23 by associating them with each other so that the user can visually check the images.

Further, provisions may be made for the second central processing unit 26 to read the characters from the binarized image and convert them to character data. Then, the information processing apparatus 20 can extract the character data with high accuracy from the binarized image. Alternatively, an OCR device may be connected to the second interface unit 21 of the information processing apparatus 20, and the binarized image may be transmitted to the OCR device. In this way, processing such as character reading can be performed using the external OCR device.

The generation of the first histogram, the generation of the second histogram, and the calculation of the static threshold performed in steps S305 to S307 may be carried out before the calculation of the dynamic threshold in step S304. Further, if the image reading apparatus 10 is equipped, for example, with a plurality of CPUs and is thus capable to concurrent processing, then the generation of the first histogram, the generation of the second histogram, and the calculation of the static threshold in steps S305 to S307 may be carried out concurrently with the calculation of the dynamic threshold in step S304.

As described in detail above, by operating the image reading apparatus 10 in accordance with the flowchart of FIG. 3, it becomes possible to set the binarization threshold so as to be able to accurately differentiate the character area from the background area, thus making it possible to binarize the input image with high accuracy.

Figure 13:
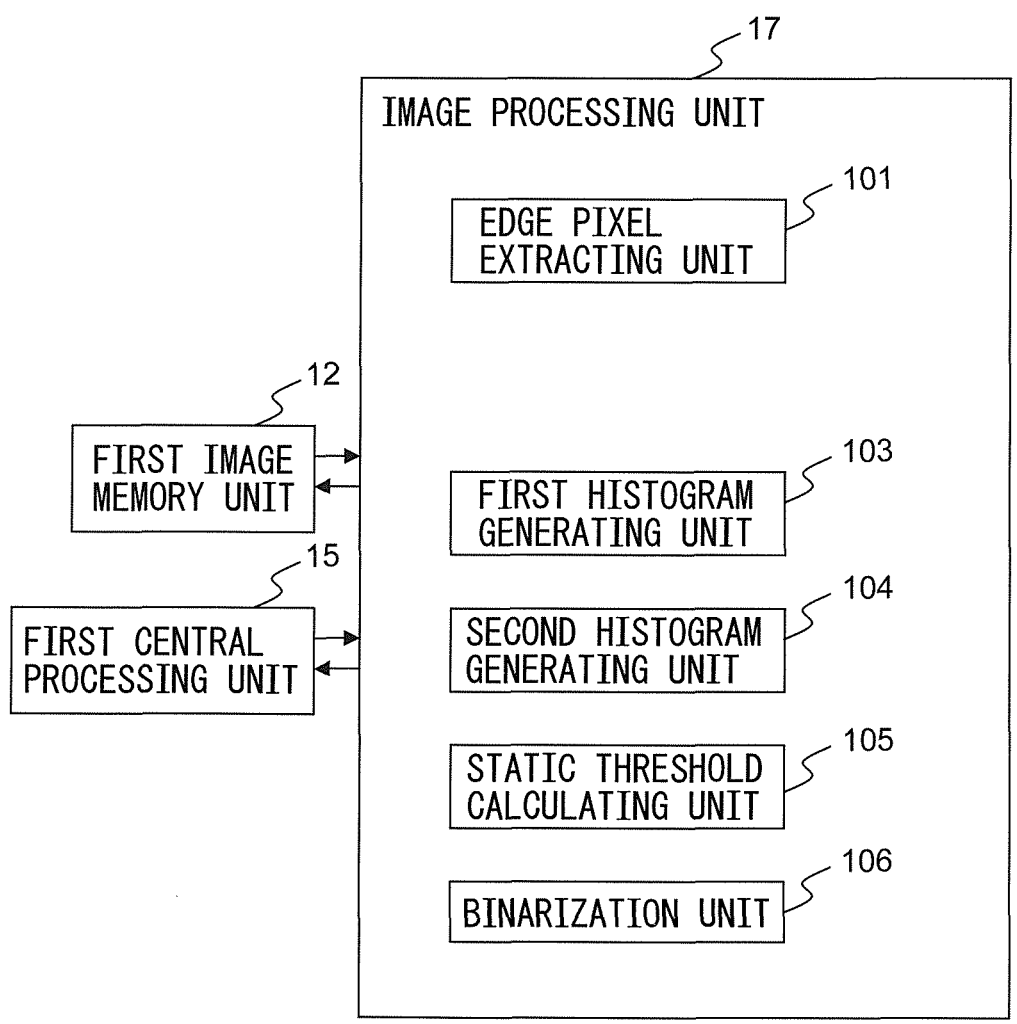
FIG. 13 is a diagram schematically illustrating the configuration of another example of the image processing unit.

FIG. 13 is a diagram schematically illustrating the configuration of another example of the image processing unit. The image processing unit 17 illustrated in FIG. 13 can be used in place of the image processing unit 16 in the image reading apparatus illustrated in FIG. 1. The image processing unit 17 of FIG. 13 differs from the image processing unit 16 of FIG. 2 by the absence of the dynamic threshold calculating unit 102.

Figure 14:
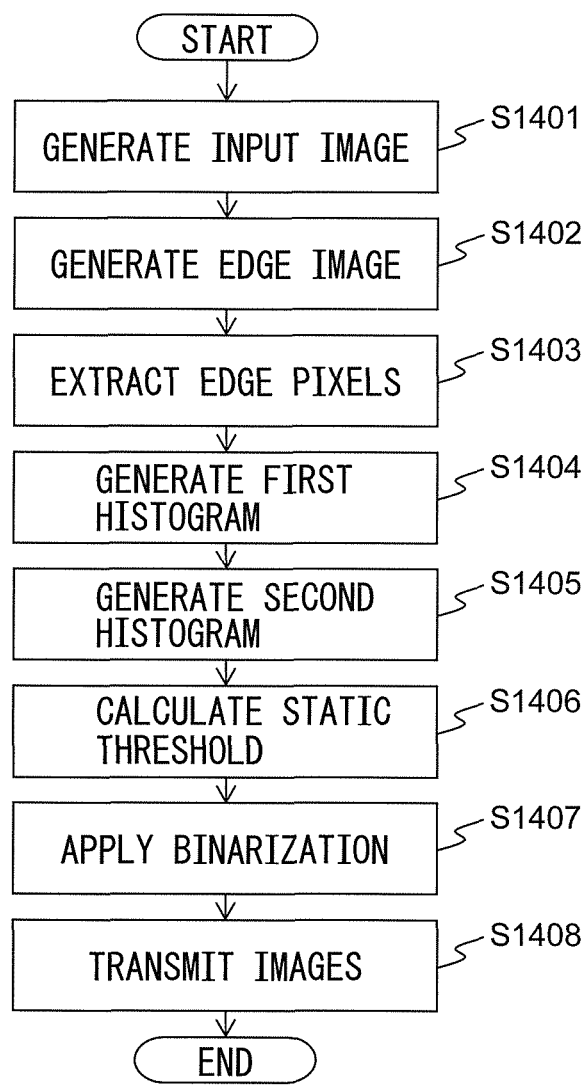
FIG. 14 is a flowchart illustrating another example of the sequence of operations performed to implement the binarization process.

FIG. 14 is a flowchart illustrating an example of the sequence of operations performed to implement the binarization process by the image reading apparatus 10 using the image processing unit 17 of FIG. 13. The sequence of operations for implementing the binarization process according to this example will be described below with reference to the flowchart of FIG. 14. This flowchart can be carried out by the image reading apparatus 10 of FIG. 1 in place of the flowchart earlier illustrated in FIG. 3. The operation flow described hereinafter is executed primarily by the first central processing unit 15 in collaboration with the various component elements of the image reading apparatus 10 in accordance with the program prestored in the first storage unit 14.

The flowchart of FIG. 14 differs from the flowchart of FIG. 3 in that the dynamic threshold calculation in step S304 is omitted and the binarization is performed using only the static threshold. The process performed in steps S1401 to S1403, S1404 to S1406, and S1408 in FIG. 14 is the same as the process performed in steps S301 to S303, S305 to S307, and S309 in FIG. 3, and therefore will not be further described herein. Only the process of step S1407 will be described below.

In step S1407, the binarization unit 106 applies binarization to all the pixels in the luminance image by using the static threshold.

When the input image 900 shown in FIG. 9 is binarized using only the static threshold, the entire area of the gray background 905 including the area of the white characters 906 will be binarized to white, and the character information of the white characters 906 may be lost. On the other hand, when the input image 700 shown in FIG. 7 is binarized using only the static threshold, the binarized image 1100 shown in FIG. 11 can be generated, as in step S308 in FIG. 3.

Figures 15A, 15B:
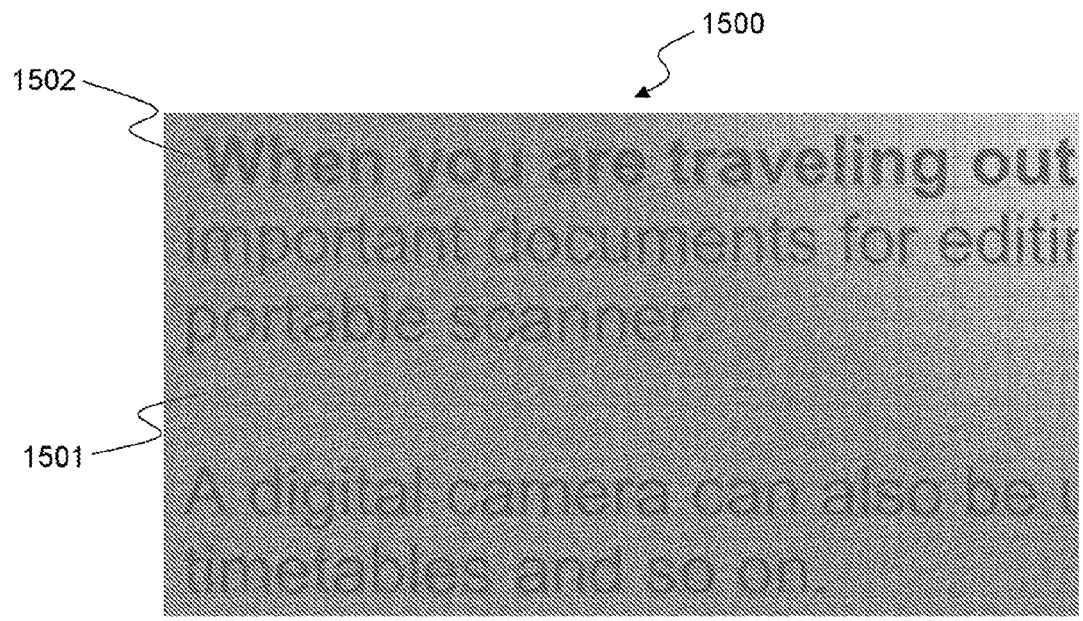
FIG. 15A is a diagram showing another example of the input image and its binarized image.
FIG. 15B is a diagram showing another example of the input image and its binarized image.

FIG. 15A shows another example of the input image, and FIG. 15B shows a binarized image generated by binarizing this particular input image in accordance with the flowchart of FIG. 14. The input image 1500 shown in FIG. 15A is composed of a background 1501 whose luminance varies in gradation and characters 1502 whose luminance is not appreciably different from the luminance of the background 1501. For such an input image 1500, the static threshold calculating unit 105 sets the static threshold somewhere between the luminance value of the lowest luminance pixel (the darkest pixel) in the background 1501 and the luminance value of the characters 1502. Then, the binarization unit 106 can generate the binarized image 1510 by extracting the characters 1502 using only the thus set static threshold.

FIG. 16A shows still another example of the input image, and FIG. 16B shows a binarized image generated by binarizing this particular input image in accordance with the flowchart of FIG. 14. The input image 1600 shown in FIG. 16A is composed of a plurality of gray backgrounds 1601 to 1603 having different luminance values, black characters 1604, a black background 1605, and white characters 1606. For such an input image 1600, the static threshold calculating unit 105 sets the static threshold somewhere between the luminance value of the gray background 1601 having the lowest luminance among the gray backgrounds 1601 to 1603 and the luminance value of the black characters 1604. Then, the binarization unit 106 can generate the binarized image 1610 by extracting the black characters 1604 and white characters 1606 using only the thus set static threshold.

That is, when the luminance image is such that the background luminance does not vary over a wide range (in particular, when the characters are displayed only in black), the character area can be properly differentiated from the background area, even if the binarization is performed using only the static threshold. In this case, the processing burden can be reduced because there is no need to calculate the dynamic threshold.

As described in detail above, by operating the image reading apparatus 10 in accordance with the flowchart of FIG. 14, it is possible to binarize the input image with high accuracy, while reducing the processing burden.

Figure 17:
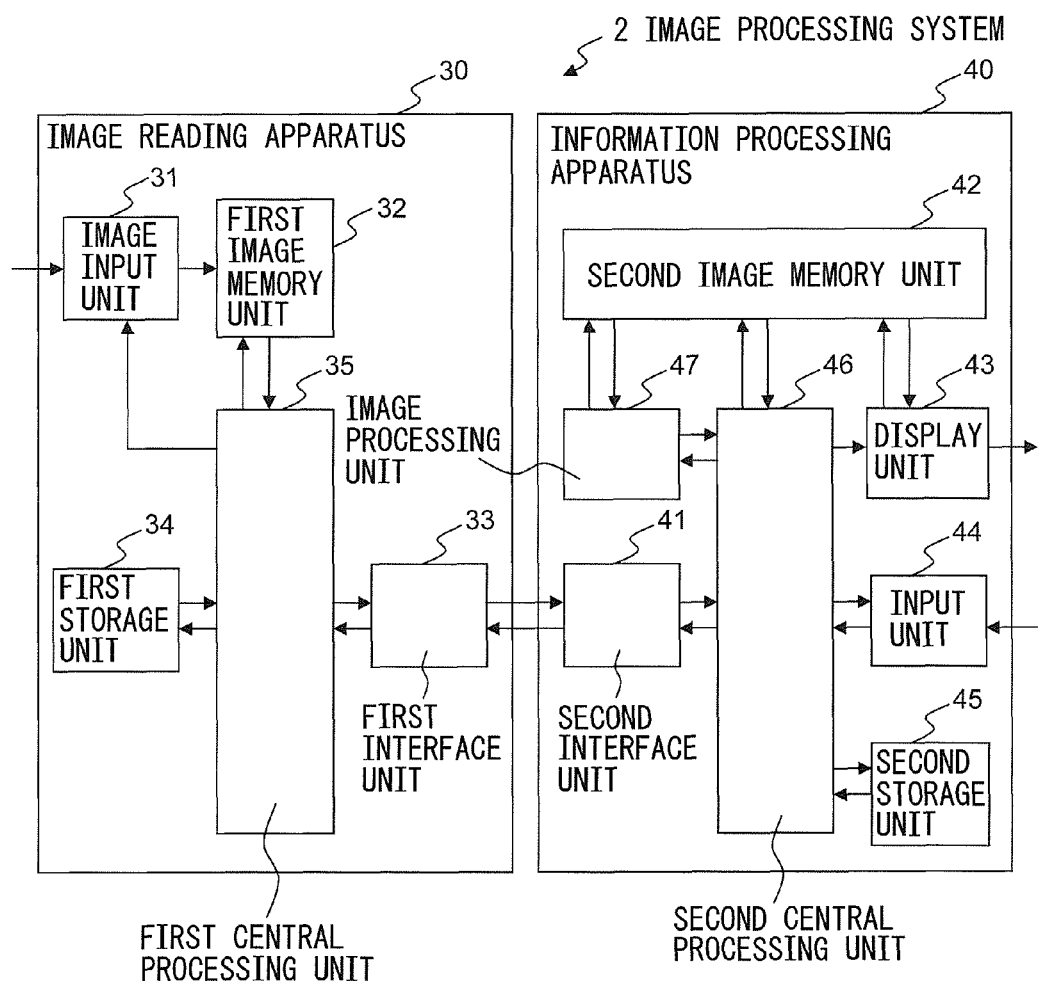
FIG. 17 is a diagram schematically illustrating the configuration of an alternative image processing system.

FIG. 17 is a diagram schematically illustrating the configuration of an alternative image processing system 2. The image processing system 2 of FIG. 17 differs from the image processing system 1 of FIG. 1 in that the apparatus equipped with the image processing unit is different. More specifically, in the image processing system 2, the information processing apparatus 40, not the image reading apparatus 30, is equipped with the image processing unit 47. The image processing unit 47 is identical in function to the image processing unit 16 or 17 provided in the image reading apparatus 10.

The image processing system 2 of FIG. 17 can implement substantially the same process as that illustrated in FIG. 3 or 14. The following describes how the process illustrated in the flowchart of FIG. 3 is applied here. In the image processing system 2, the process of step S301 is executed primarily by the first central processing unit 35 in collaboration with the various component elements of the image reading apparatus 30 in accordance with the program prestored in the first storage unit 34, and the process of steps S302 to S308 is executed primarily by the second central processing unit 46 in collaboration with the various component elements of the information processing apparatus 40 in accordance with the program prestored in the second storage unit 45.

In step S301, the image input unit 31 in the image reading apparatus 30 generates an input image and stores it in the first image memory unit 32, and the first central processing unit 35 transmits the input image via the first interface unit 33 to the information processing apparatus 40. On the other hand, in the information processing apparatus 40, when the input image transmitted from the image reading apparatus 30 is received via the second interface unit 41, the second central processing unit 46 stores the received input image in the second image memory unit 42.

The process of steps S302 to S308 is carried out by the image processing unit 47 in the information processing apparatus 40. The sequence of operations in this process is the same as that carried out by the image processing unit 16 in the image reading apparatus 10 earlier described in connection with the image processing system 1. In the image processing system 2, the image transmission step S309 is omitted, because the binarization is performed by the image processing unit 47 in the information processing apparatus 40.

Likewise, when the process illustrated in the flowchart of FIG. 14 is applied to the image processing system 2, the process of step S1401 is executed primarily by the first central processing unit 35 in collaboration with the various component elements of the image reading apparatus 30 in accordance with the program prestored in the first storage unit 34, and the process of steps S1402 to S1407 is executed primarily by the second central processing unit 46 in collaboration with the various component elements of the information processing apparatus 40 in accordance with the program prestored in the second storage unit 45. The process of step S1401 is the same as the process of step S301. On the other hand, the process of steps S1402 to S1407 is carried out by the image processing unit 47 in the information processing apparatus 40, and the process of step S1408 is omitted.

As described above, when the information processing apparatus 40 is equipped with the image processing unit 47 and performs the threshold calculation and binarization process, the same effect can be achieved as when the image reading apparatus is equipped with the image processing unit and performs the threshold calculation and binarization process.

While the preferred embodiments thereof has been described, it will be appreciated that the present invention is not limited to the above specific embodiments. For example, the division of functionality between the image reading apparatus and the information processing apparatus is not limited to the example of the image processing system illustrated in FIG. 1 or 17, but the functional units, including those of the image processing unit, may be interchanged as desired between the image reading apparatus and the information processing apparatus. Alternatively, the image reading apparatus and the information processing apparatus may be combined into one apparatus.

Further, in the image processing system 1 of FIG. 1, the first interface unit 13 of the image reading apparatus 10 may be connected to the second interface unit 21 of the information processing apparatus 20 via a network, such as the Internet, a telephone network (including a mobile telephone network or a public switched telephone network), or an intranet, rather than directly connecting them together. In that case, the first interface unit 13 and the second interface unit 21 are each equipped with a communication interface circuit for connection to the network.

Likewise, in the image processing system 2 of FIG. 17 also, the first interface unit 33 of the image reading apparatus 30 and the second interface unit 41 of the information processing apparatus 40 may be interconnected via a network. In that case, a plurality of information processing apparatuses 40 may be installed in a distributed manner over the network so that the image processing service can be provided in the form of cloud computing, and the processing such as the threshold calculation, binarization, image storage, etc. may be performed with the information processing apparatuses 40 collaborating with each other. In this way, the image processing system 2 can efficiently binarize input images generated by a plurality of image reading apparatuses 30.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An image processing apparatus comprising:
an edge pixel extractor circuit for extracting edge pixels from an input image;
a first histogram generator circuit for generating a first histogram based on a luminance value of each of said edge pixels;
a second histogram generator circuit for generating a second histogram based on a minimum luminance value among the luminance values of pixels neighboring each of said edge pixels;
a static threshold calculator circuit for obtaining a static threshold based on said first histogram and said second histogram; and
a binarization circuit for binarizing said input image by using said static threshold.

2. The image processing apparatus according to claim 1, further comprising a dynamic threshold calculator circuit for obtaining, for each of said edge pixels, a dynamic threshold based on the luminance value of said edge pixel and on the minimum luminance value among the luminance values of the pixels neighboring said edge pixel, and wherein
said binarization circuit binarizes said edge pixel and said neighboring pixels by using said dynamic threshold obtained for said edge pixel, and binarizes other pixels than said edge pixel and said neighboring pixels by using said static threshold.

3. The image processing apparatus according to claim 1, wherein when a luminance value representing a converging point on a low-luminance side of said first histogram is equal to or higher than a luminance value representing a converging point on a high-luminance side of said second histogram, said static threshold calculator circuit sets said static threshold equal to an average value taken between the luminance value representing the converging point on the low-luminance side of said first histogram and the luminance value representing the converging point on the high-luminance side of said second histogram.

4. The image processing apparatus according to claim 1, wherein when the luminance value representing the converging point on the low-luminance side of said first histogram is lower than the luminance value representing the converging point on the high-luminance side of said second histogram, said static threshold calculator circuit sets said static threshold equal to a luminance value taken at a point where said first histogram intersects said second histogram.

5. The image processing apparatus according to claim 2, wherein said dynamic threshold calculator circuit calculates said dynamic threshold by taking a sum of the luminance value of said edge pixel and said minimum luminance value each multiplied by a predetermined weighting factor.

6. An image processing method comprising:
extracting edge pixels from an input image;
generating a first histogram based on a luminance value of each of said edge pixels;
generating a second histogram based on a minimum luminance value among the luminance values of pixels neighboring each of said edge pixels;
obtaining a static threshold based on said first histogram and said second histogram; and
binarizing said input image by using said static threshold, wherein the method is performed by one or more processors.

7. A computer-readable, non-transitory medium storing a computer program, wherein said computer program causes a computer to execute a process, the process comprising:
extracting edge pixels from an input image;
generating a first histogram based on a luminance value of each of said edge pixels;
generating a second histogram based on a minimum luminance value among the luminance values of pixels neighboring each of said edge pixels;
obtaining a static threshold based on said first histogram and said second histogram; and
binarizing said input image by using said static threshold.

8. The image processing method according to claim 6, further comprising obtaining, for each of said edge pixels, a dynamic threshold based on the luminance value of said edge pixel and on the minimum luminance value among the luminance values of the pixels neighboring said edge pixel, and wherein
said binarizing comprises binarizing said edge pixel and said neighboring pixels by using said dynamic threshold obtained for said edge pixel, and binarizing other pixels than said edge pixel and said neighboring pixels by using said static threshold.

9. The image processing method according to claim 6, wherein when a luminance value representing a converging point on a low-luminance side of said first histogram is equal to or higher than a luminance value representing a converging point on a high-luminance side of said second histogram, setting said static threshold equal to an average value taken between the luminance value representing the converging point on the low-luminance side of said first histogram and the luminance value representing the converging point on the high-luminance side of said second histogram.

10. The image processing method according to claim 6, wherein when the luminance value representing the converging point on the low-luminance side of said first histogram is lower than the luminance value representing the converging point on the high-luminance side of said second histogram, setting said static threshold equal to a luminance value taken at a point where said first histogram intersects said second histogram.

11. The image processing method according to claim 8, wherein said dynamic threshold is calculated by taking a sum of the luminance value of said edge pixel and said minimum luminance value each multiplied by a predetermined weighting factor.

* * * * *